US008400674B2

(12) United States Patent
Igarashi

(10) Patent No.: US 8,400,674 B2
(45) Date of Patent: Mar. 19, 2013

(54) PRINT CONTROL APPARATUS AND PRINT CONTROL METHOD FOR THE SAME

(75) Inventor: Hiroya Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 12/431,188

(22) Filed: Apr. 28, 2009

(65) Prior Publication Data

US 2009/0273798 A1 Nov. 5, 2009

(30) Foreign Application Priority Data

May 2, 2008 (JP) ................................. 2008-120541

(51) Int. Cl.
*G06F 15/00* (2006.01)

(52) U.S. Cl. ......................... 358/1.9; 358/1.15; 399/321

(58) Field of Classification Search ................. 358/1.15, 358/1.9; 399/321
See application file for complete search history.

(56) References Cited

U.S. PATENT DOCUMENTS 5,031,116 A * 7/1991 Shukunami et al. ........... 358/1.2
5,937,225 A * 8/1999 Samuels ......................... 399/27
7,245,843 B2 7/2007 Bessho
2006/0188301 A1* 8/2006 Ng et al. ....................... 399/341
2008/0298860 A1* 12/2008 Omata ......................... 399/321

FOREIGN PATENT DOCUMENTS

JP H06-262821 A 9/1994
JP 2005-275250 A 10/2005

* cited by examiner

*Primary Examiner* — Marivelisse Santiago Cordero
*Assistant Examiner* — Moustapha Diaby
(74) *Attorney, Agent, or Firm* — Canon U.S.A., Inc. IP Division

(57) ABSTRACT

A PDL controller divides a print job of providing instructions to perform printing using color toners and a clear toner into a print job using the color toners and a print job using the clear toner in accordance with a ratio in an entire image formed on the basis of the print job of an image area when a sum of a total amount of the color toners used and a predetermined amount of the special toner used exceeds an upper limit of an amount of toner used in printing, and transmits the print jobs to a printing apparatus. Also, when printing based on the print job using the clear toner is to be performed, the PDL controller allows a display unit to display a guide to set a printout generated on the basis of the print job using the color toners to a paper feeder.

17 Claims, 14 Drawing Sheets

FIG. 15

| DIRECTORY INFORMATION |
|---|
| FIRST PROCESSING PROGRAM<br>PROGRAM CODE GROUP CORRESPONDING TO STEPS OF FLOWCHART IN FIG. 5 |
| SECOND PROCESSING PROGRAM<br>PROGRAM CODE GROUP CORRESPONDING TO STEPS OF FLOWCHART IN FIG. 6 |
| THIRD PROCESSING PROGRAM<br>PROGRAM CODE GROUP CORRESPONDING TO STEPS OF FLOWCHART IN FIG. 8 |
| FOURTH PROCESSING PROGRAM<br>PROGRAM CODE GROUP CORRESPONDING TO STEPS OF FLOWCHART IN FIG. 12 |

PRINT CONTROL APPARATUS AND PRINT CONTROL METHOD FOR THE SAME

BACKGROUND OF THE INVENTION

1. Field of the Invention

The present invention relates to a print control apparatus to digitally generate and control image data used to form an image on a sheet by an image forming apparatus. More specifically, the present invention relates to a print control apparatus, a print control method, and a program that control printing using at least one color of special toner (e.g., toner for adjusting glossiness) in addition to a plurality of color toners of cyan, magenta, yellow, and black.

2. Description of the Related Art

In recent years, the utility value of digital printing techniques has been surely increasing in an on-demand print market and a document print market of a small number of copies. Particularly, a full-color printing technique using electrophotography has the advantage over other printing techniques in terms of productivity, printing cost, and easiness in maintenance, and the market thereof is being rapidly widespread.

Under these circumstances, not only conventional full-color printing based on electrophotography using four colors (CMYK) of toners but also multicolor printing further using a special toner have been receiving attention, and a special printing market of high immediacy and on-demand characteristic has come into view.

Printing using a special toner, such as a clear toner, has become a focus of attention. There exists a printing apparatus to perform printing by superimposing a special toner, called a clear toner, on a color print in order to give glossiness to the color print.

In a typical printing method using the clear toner, the clear toner is evenly applied over an entire surface to increase glossiness. On the other hand, demand for a printing method of partially applying the clear toner has been increasing.

For example, Patent Document 1 (Japanese Patent Laid-Open No. 6-262821) suggests a technique of printing information about an apparatus in the form of watermark by using a clear toner.

Patent Document 2 (Japanese Patent Laid-Open No. 2005-275250) suggests a technique of increasing glossiness by using a clear toner in addition to toners of four colors (CMYK).

In the above-mentioned related arts, printing using a clear toner is performed but setting in a printing apparatus to perform clear toner printing is not particularly considered. Without consideration of setting in the printing apparatus, a limit of the amount of toner used in each page is not properly controlled, so that improper printing may be performed.

SUMMARY OF THE INVENTION

The present invention is directed to solving the above-described problems. Specifically, the present invention is directed to providing a mechanism capable of preventing improper printing, e.g., a clear toner is not put partially, due to the amount of toner used during a printing process performed when a user provides instructions to perform printing using color toners and printing using a clear toner.

A print control apparatus according to an embodiment of the present invention processes a print job of providing instructions to perform printing using a plurality of color toners and a special toner for adjusting glossiness. The print control apparatus includes a determining unit configured to determine whether a sum of a total amount of the color toners used and a predetermined amount of the special toner used exceeds an upper limit of an amount of toner used in printing in a printing apparatus specified in the print job in an image formed on the basis of the print job; a dividing unit configured to divide the print job into a first print job using the color toners and a second print job using the special toner in accordance with a ratio in the entire image of an image area where the determining unit determines that the sum of the total amount of the color toners used and the predetermined amount of the special toner used exceeds the upper limit; a transmitting unit configured to transmit the first and second print jobs generated by the dividing unit to the printing apparatus; and a display instruction unit configured to provide instructions to allow a display unit to display a guide to set a printout generated on the basis of the first print job using the color toners to a paper feeder of the printing apparatus when printing based on the second print job using the special toner is to be performed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 illustrates a memory map of a computer-readable storage medium (recording medium) to store various data processing programs readable in the print control apparatus according to an embodiment of the present invention.

DESCRIPTION OF THE EMBODIMENTS

Figure 1:
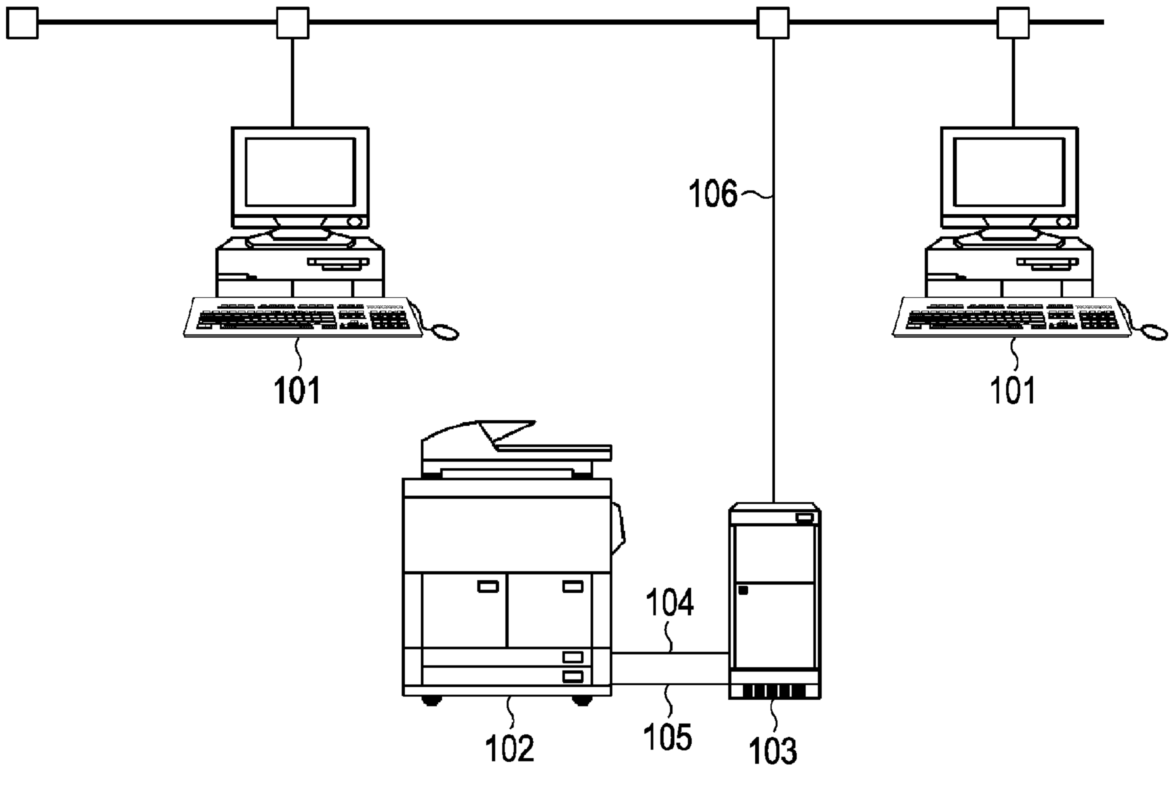
FIG. 1 illustrates a configuration of an image processing system according to an embodiment of the present invention.

The following first and second methods are used as a printing method using a clear toner according to an embodiment.

In the first method, two jobs: a color print job and a clear toner print job, are individually generated by a user operation, and printing using a clear toner is performed on a result obtained from the color print job on the basis of the clear toner print job. More specifically, in the clear toner print job, image data like form data is stored in a BOX area or the like of a printing apparatus, a user sets a result obtained from the color print job on a paper feeder, and then printing using a clear toner is performed as in form combining printing. Here, color printing may be performed by an apparatus and clear-toner printing may be performed by another apparatus.

In the second method, color printing and clear-toner printing are performed in a single job.

The above-described first and second methods have problems described below, and thus embodiments of the present invention provide a printing method based on an appropriate use of the both methods.

In the first method, two jobs are input to obtain a printed result, which is very inconvenient for the user.

A job including use and nonuse of a clear toner includes pages where a clear toner is used and is not used, and thus a difference exists between a page on which first printing (printing with toners of four colors (CMYK)) is performed and a page on which second printing (printing with a clear toner) is performed. This causes the necessity of sorting printed results into a page on which both the first printing and second printing are performed; and a page on which only the first printing is performed, which leads to the necessity of further complicated settings for inputting a job.

Furthermore, when printing is to be performed by using a clear toner, a user may have a difficulty in determining the paper feeder of a printing apparatus where a color print should be put and determining the orientation of the color print. For this reason, the user may often set the color print (result) on an inappropriate paper feeder or set the color print in a reversed orientation, so that printing with a clear toner ends in failure.

In the second method, the amount of toner used in one printing process increases because a clear toner is used in addition to toners of four colors (CMYK). Putting too much toner on each pixel of a sheet during printing in a printing apparatus causes blurring of an image, a conveyance error, and so on. Thus, an upper limit is set so that a toner can be used within a certain amount in each pixel of a sheet in one printing process. For example, when a maximum amount of a single-color toner is 100%, the upper limit is set to 240%.

Therefore, when color printing and clear-toner printing are performed in a single job as described above, a job specifying method based on the setting of a printing apparatus should be used. Otherwise, improper printing can occur disadvantageously, e.g., the amount of toner put on each pixel exceeds an upper limit, so that a clear toner is not evenly put or that a printing process itself is not performed. If the amount of clear toner applied is reduced to prevent such a trouble, sufficient glossiness is not obtained in a printed result.

In the embodiments of the present invention, instructions to perform both printing using color toners and printing using a clear toner are provided in a single job for the easiness of the specifying method (the details are described below). If it is determined that the amount of toner put on each pixel of one page in printing exceeds an upper limit allowed in the printing apparatus, printing instructions are provided to the printing apparatus by dividing the job into two jobs. That is, a main feature of the embodiments is switching from the second method to the first method depending on the amount of toner used. By using the first method, printing can be performed by using a clear toner in the same state as that in printing on an ordinary sheet. Accordingly, a sufficient amount of clear toner can be applied on a desired portion.

Furthermore, when a single job is divided into two jobs, a guide is displayed for the user at printing using a clear toner. Accordingly, the user can prevent a wrong setting of a color print obtained in advance. In other words, the user can easily set the color print on a paper feeder in a correct orientation while seeing the displayed guide.

Hereinafter, embodiments are described as specific explanations to realize the present invention.

A first embodiment of the present invention will be described below referring to the drawings.

<Image Processing System>

FIG. 1 illustrates a configuration of an image processing system according to an embodiment of the present invention.

Referring to FIG. 1, client computers 101 are used by users to create document data by using an application. A printing apparatus 102 is a copying machine having a plurality of functions, also called multifunction peripheral, based on electrophotography or the like.

A PDL (Page Description Language) controller 103 interprets data created in the client computer 101 and PDL data that is output from a printer driver at printing. Also, the PDL controller 103 expands the data created in the client computer 101 to bitmap data and transmits it to the printing apparatus 102.

Reference numeral 104 denotes a controlling interface cable. Print data is transmitted to the printing apparatus 102 through the controlling interface cable 104. Also, control commands are transmitted/received through the controlling interface cable 104 when print data is scanned.

Reference numeral 105 denotes a video interface cable. Expanded video data is transmitted to the printing apparatus 102 through the video interface cable 105.

Reference numeral 106 denotes a LAN (Local Area Network) cable of the PDL controller 103. The client computers 101 and the PDL controller 103 are mutually connected in a network through the LAN cable 106.

Each of the client computers 101 is a personal computer or the like, includes a CPU (Central Processing Unit), a ROM (Read Only Memory), a RAM (Random Access Memory), and HDD (Hard Disk Drive) not illustrated, and realizes various functions when the CPU executes a program stored in the HDD or ROM by using the RAM as necessary.

<Printing Apparatus>

Figure 2:
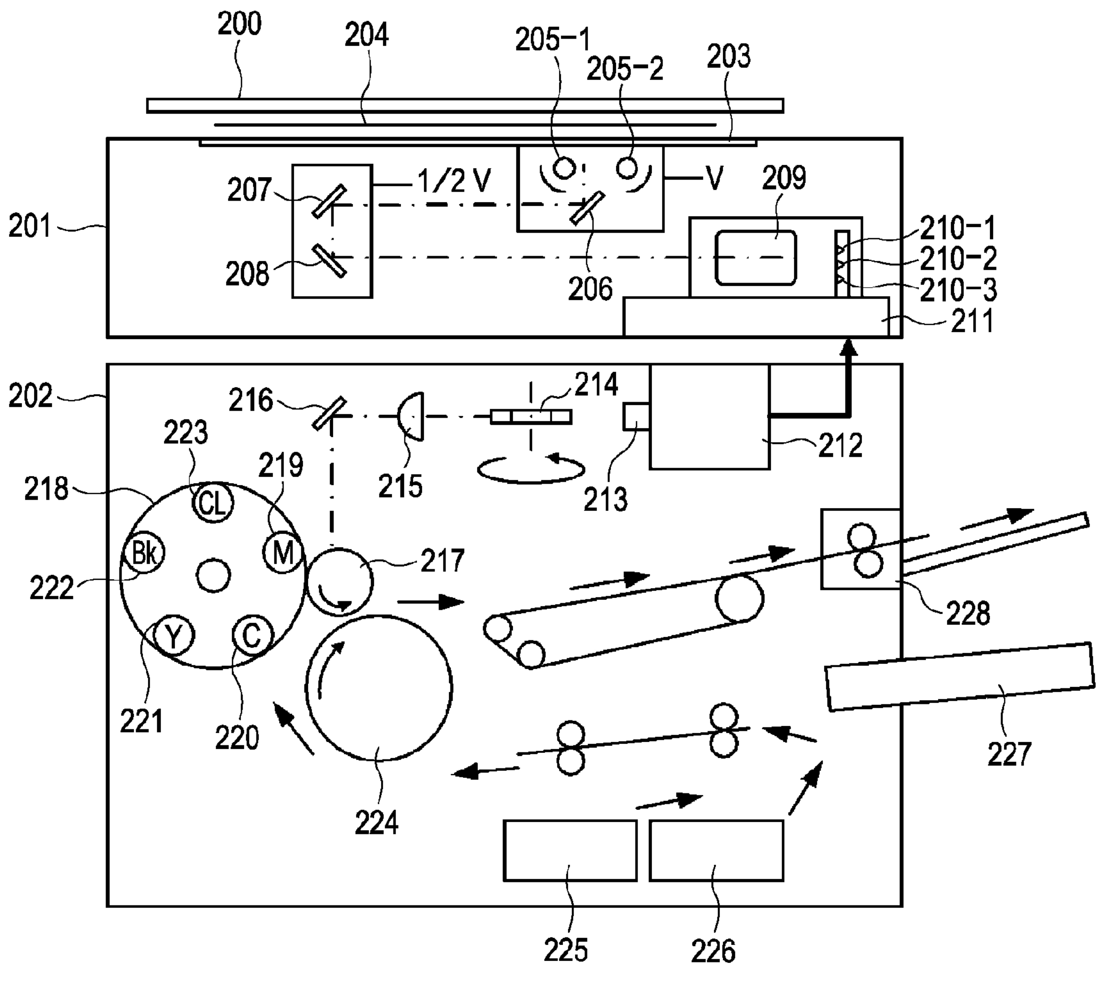
FIG. 2 is a cross-sectional view illustrating an example of a configuration of the printing apparatus illustrated in FIG. 1.

FIG. 2 is a cross-sectional view illustrating an example of a configuration of the printing apparatus 102 illustrated in FIG. 1.

Referring to FIG. 2, an image scanner unit 201 reads documents and processes digital signals. A printer unit 202 prints an image corresponding to a document image read by the image scanner unit 201 on a sheet in full color and outputs the sheet.

The image scanner unit 201 includes a mirror pressure plate 200. A document 204 put on a document plate glass (platen) 203 is irradiated by lamps 205-1 and 205-2.

Light emitted from the lamps 205-1 and 205-2 is led by mirrors 206, 207, and 208, and a lens 209 forms an image on three lines of solid-state image pickup device sensors (CCD) 210-1, 210-2, and 210-3. Then, three image signals of red (R), green (G), and blue (B) as full-color information of the document 204 are transmitted to a signal processing unit 211.

The lamps 205-1 and 205-2 and the mirror 206 mechanically move at velocity v in the direction vertical to an electrical scanning (main scanning) direction of a line sensor, so as to scan (sub scan) an entire surface of a document. The mirrors 207 and 208 mechanically move at velocity ½v in the direction vertical to an electrical scanning (main scanning) direction of the line sensor, so as to scan (sub-scan) the entire surface of the document.

Here, the document 204 is read at a resolution of 600 dpi (dots/inch) both in the main and sub scanning directions. Image signals generated by the reading are accumulated in units of pages of a document in a data accumulating unit in the signal processing unit 211.

In the signal processing unit 211, the image signals accumulated therein are electrically processed in units of pixels, divided into respective components of magenta (M), cyan (C), yellow (Y), and black (Bk), and are transmitted to the printer unit 202. Also, a clear pattern generating unit, which is placed in the signal processing unit 211, generates clear image data (CL) in units of pixels and transmits the generated data to the printer unit 202.

The output image signals of M, C, Y, Bk, and CL are transmitted to a laser driver 212. The laser driver 212 performs modulation drive on a semiconductor laser 213 in accordance with the transmitted image signals.

Laser light scans over a photoconductive drum 217 via a polygonal mirror 214, an fθ lens 215, and a mirror 216. Here, data is written at a resolution of 600 dpi (dots/inch) both in the main and sub scanning directions, as in the reading.

A rotary developer 218 includes a magenta developing unit 219, a cyan developing unit 220, a yellow developing unit 221, a black developing unit 222, and a clear developing unit 223. The five developing units 219 to 223 alternately come into contact with the photoconductive drum 217 and develop an electrostatic image formed on the photoconductive drum 217 by using toners of the respective colors (M, C, Y, Bk, and clear).

A transfer drum 224 transfers the image developed on the photoconductive drum 217 onto a sheet by wrapping the sheet supplied from a paper cassette 225 or 226 or a manual paper feed tray 227 around the transfer drum 224.

In this way, the toners of the five colors (M, C, Y, Bk, and clear) are sequentially transferred onto the sheet, the sheet passes through a fusing unit 228, where the toners are fused on the sheet, and the sheet is output. The clear toner becomes clear after fusing, and serves as a special toner for adjusting glossiness.

<PDL Controller>

Figure 3:
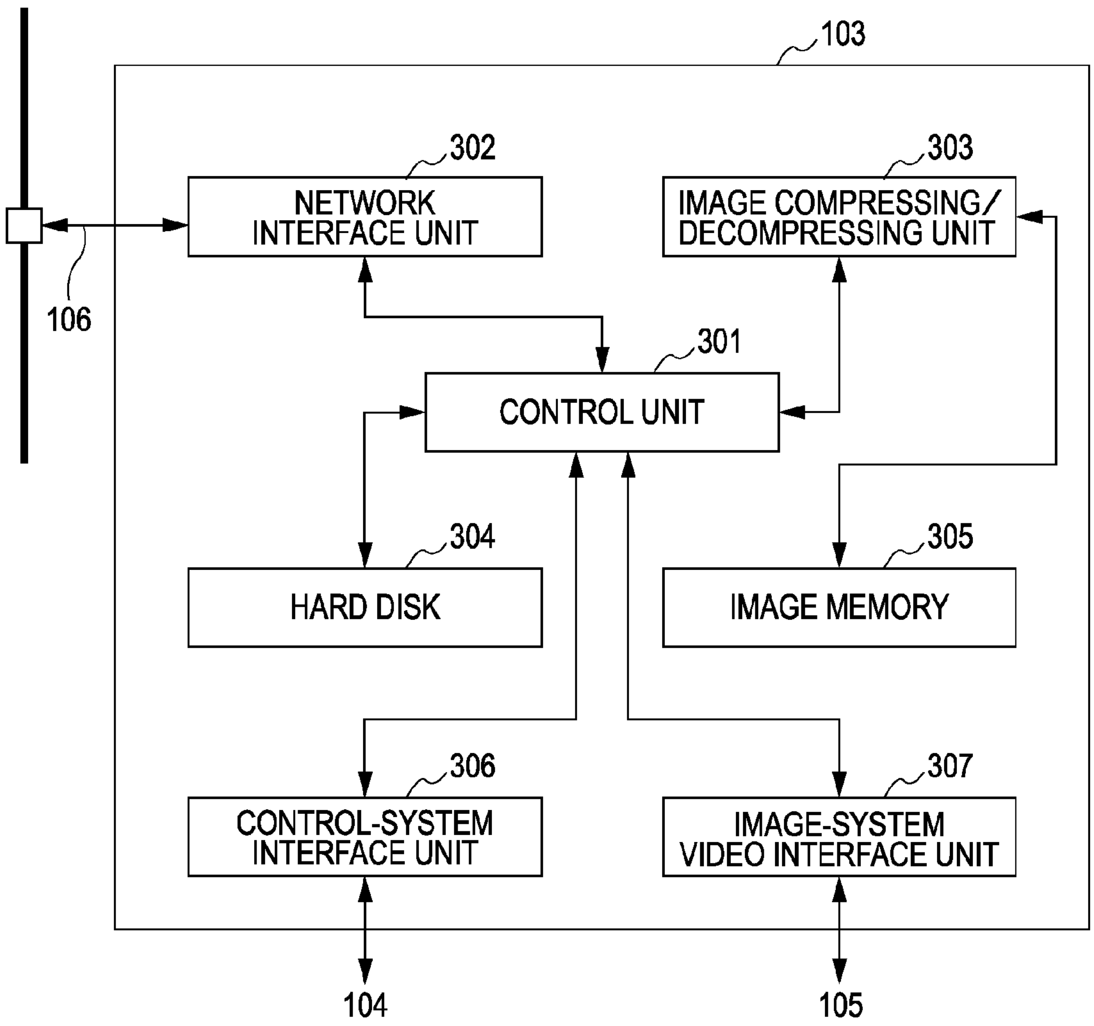
FIG. 3 is a block diagram illustrating a configuration of the PDL controller illustrated in FIG. 1.

FIG. 3 is a block diagram illustrating a configuration of the PDL controller 103 illustrated in FIG. 1.

When printing is performed from the client computer 101 (FIG. 1), a print job created in the client computer 101 is transmitted to the PDL controller 103 through the network. In this embodiment, the print job is PDL data described in PDL (Page Description Language).

In the PDL controller 103, the PDL data transmitted from the client computer 101 is received via a network interface unit 302 and is expanded to raster image data in units of bands by a control unit 301. Furthermore, the image data is compressed by an image compressing/decompressing unit 303 and is written in an image memory 305.

Then, instructions to perform printing are provided to a device controller (not illustrated) in the printing apparatus 102 via a control-system interface unit 306. Then, compressed image data read from the image memory 305 is decompressed by the image compressing/decompressing unit 303.

Then, the image data is transmitted to the device controller in the printing apparatus 102 via an image-system video interface unit 307, image formation is performed, and the image is printed.

The control unit 301 includes a CPU, a ROM, and a RAM (not illustrated), and realizes various controls when the CPU executes a program stored in the ROM or a hard disk 304 as necessary by using the RAM.

<Setting of Printing Using Clear Toner>

Hereinafter, a description is given about the setting that is made to perform printing using a clear toner with reference to FIG. 4.

Figure 4:
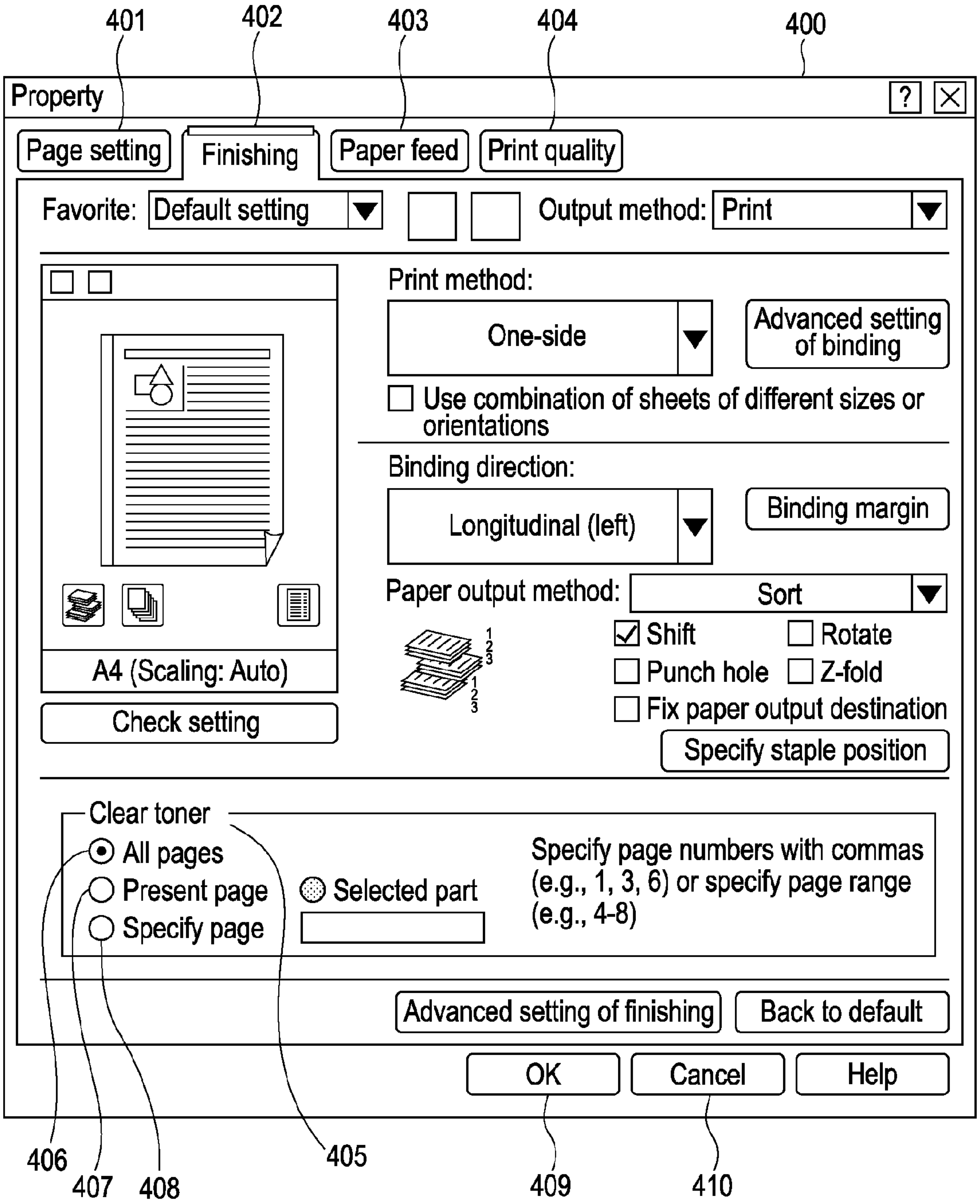
FIG. 4 illustrates a print setting window of a printer driver.

FIG. 4 illustrates a print setting window of the printer driver. This print setting window is displayed on a monitor (not illustrated) of the client computer 101 when the CPU (not illustrated) of the client computer 101 executes a program stored in the HDD. On the print setting window, settings can be input by using a keyboard or a pointing device (not illustrated) of the client computer 101.

As illustrated in FIG. 4, the print setting window 400 of the printer driver includes four tabs: a page setting tab 401, a finishing tab 402, a paper feed tab 403, and a print quality tab 404. Also, the print setting window 400 includes an OK button 409 and a cancel button 410.

FIG. 4 illustrates a state where the finishing tab 402 is selected. When a user wants to use a clear toner, the user makes a setting by selecting any of "all pages" 406, "present page" 407, and "specify page" 408 in a clear toner setting field 405. At this time, the area where the clear toner is to be put can be specified, e.g., an entire page or a part where a color object exists. Alternatively, the user can freely specify the area or an image like a watermark can be selected.

<Process Including Clear Toner Plane>

A print job including a clear toner plane transmitted from the client computer 101 is PDL data having CMYK planes and a clear toner usage attribute in each page (based on the setting in the field 405 in FIG. 4). The PDL data is transmitted from the client computer 101 to the PDL controller 103, where a RIP (Raster Image Processor) process is performed on the PDL data.

Figure 5:
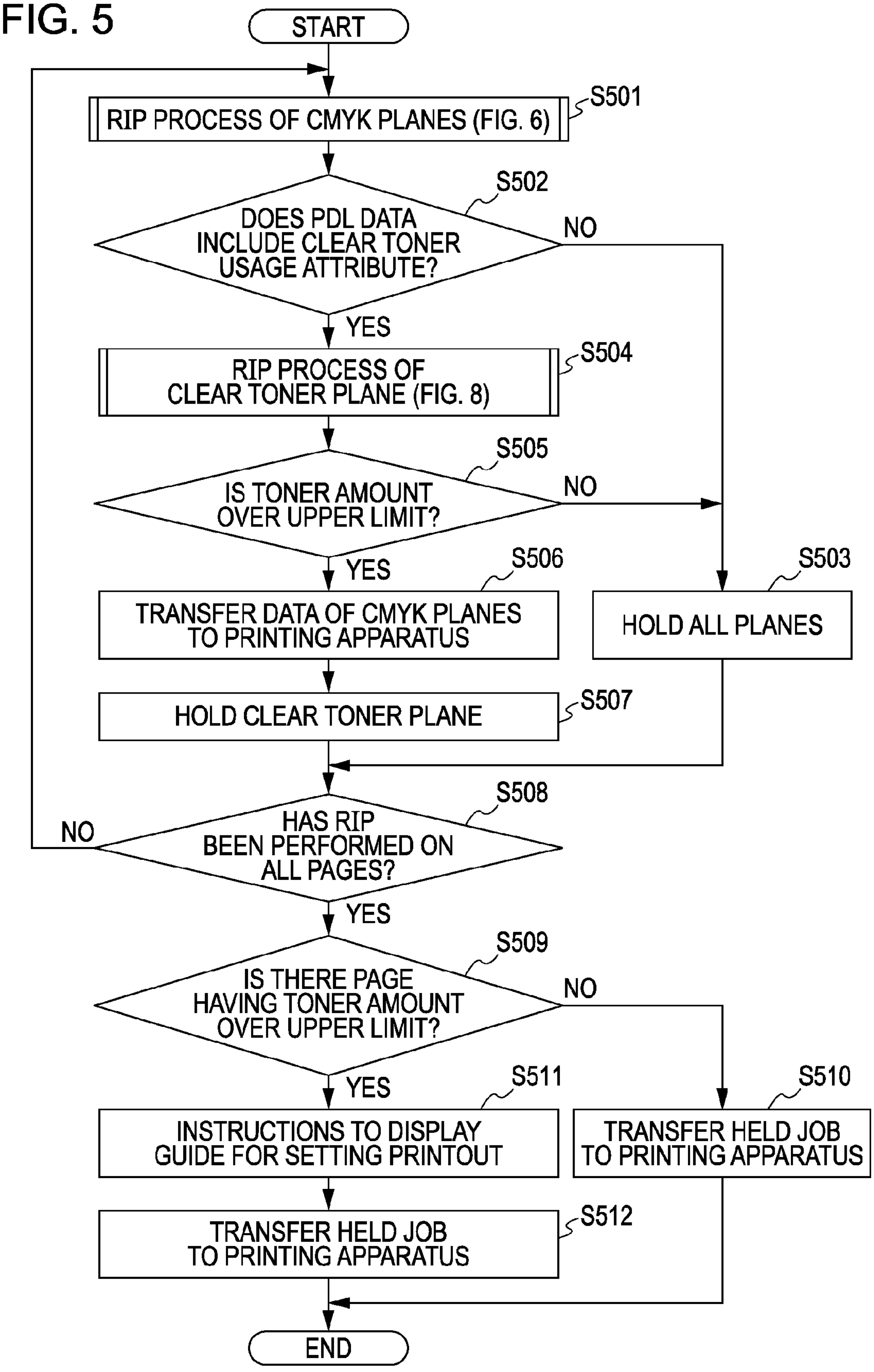
FIG. 5 is a flowchart illustrating an example of a printing process including a clear toner plane performed by a print control apparatus according to an embodiment of the present invention.

FIG. 5 is a flowchart illustrating an example of a printing process including a clear toner plane performed in the print control apparatus according to an embodiment of the present invention. The process in this flowchart is realized when the CPU (not illustrated) of the control unit 301 in the PDL controller 103 reads a program stored in the ROM or the hard disk 304 to the RAM and executes the program.

The control unit 301 starts the process in this flowchart upon receiving PDL data transmitted from the client computer 101 via the network interface unit 302.

First, in step S501, the control unit 301 performs a RIP process of CMYK planes (FIG. 6) on the received PDL data, so as to create data of 32 bits per pixel (8 bits for respective colors of CMYK). Now, the RIP process of CMYK planes is described with reference to FIG. 6.

<RIP Process of CMYK Planes>

Figure 6:
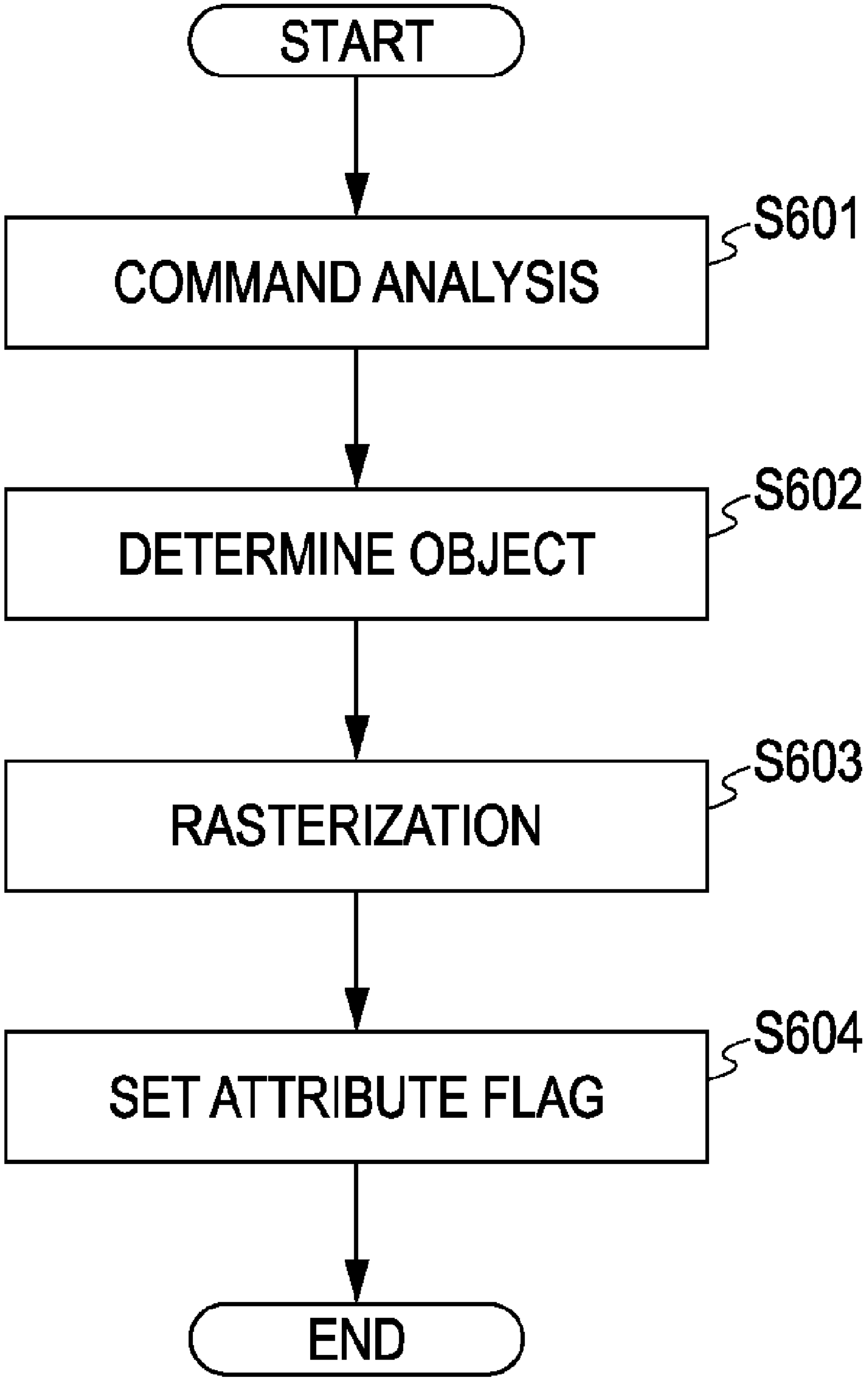
FIG. 6 is a flowchart illustrating an example of a RIP process of CMYK planes performed in step S501 in FIG. 5.

FIG. 6 is a flowchart illustrating an example of the RIP process of CMYK planes illustrated in step S501 in FIG. 5. The process in this flowchart is realized when the CPU (not illustrated) of the control unit 301 in the PDL controller 103 reads a program stored in the ROM or the hard disk 304 to the RAM and executes the program.

In step S601, the control unit 301 performs command analysis on split data of the CMYK planes generated by the printer driver of the client computer 101 and transmitted to the PDL controller 103.

In step S602, the control unit 301 determines an object as a target of RIP in view of the result of the command analysis. The determined object is classified into three types: text, image, and graphics.

In step S603, the control unit 301 performs rasterization and generates output image data. The output image data is compressed by the image compressing/decompressing unit 303 and is written in the image memory 305.

Figure 7:
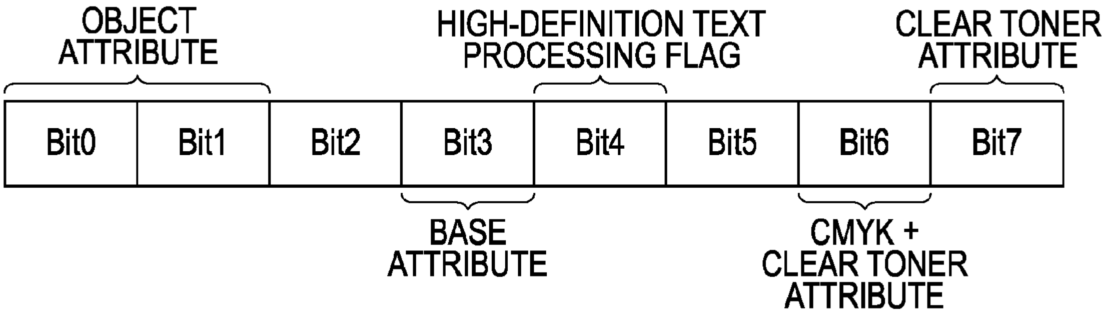
FIG. 7 illustrates an example of a configuration of an attribute flag.

In step S604, the attribute flag illustrated in FIG. 7 is set on the basis of the object determination result obtained in step S602 and the output image data generation result obtained in step S603. Now, the attribute flag is described with reference to FIG. 7. This attribute flag is written in the image memory 305 without being compressed.

<Attribute Flag>

FIG. 7 illustrates an example of the configuration of the attribute flag. The attribute flag is 8-bit information embedded with attribute information of each pixel of the output image data. The attribute flag is transmitted from the image-system video interface unit 307 to the printing apparatus 102 through the video interface cable 105 in synchronization with the image data.

As illustrated in FIG. 7, the attribute flag includes the following pieces of attribute information. Bit0 and Bit1: Object attribute (text: 00, image: 01, graphics: 10)

Bit3: Base attribute (set 1 in the case of background)

Bit4: High-definition text processing flag (set 1 when the object is text and when high-definition text image processing is performed)

Bit6: CMYK+clear toner attribute (set 1 when printing is performed with both CMYK planes and clear toner plane)

Bit7: Clear toner attribute (set 1 when printing is performed with only clear toner plane)

On the basis of the attribute information in the attribute flag (particularly Bit6 and Bit7), the device controller in the printing apparatus 102 performs optimum image processing, e.g., changes setting of a screen for each attribute of the object.

The CMYK image data is irreversibly compressed by the image compressing/decompressing unit 303 in the PDL controller 103 and is transmitted to the printing apparatus 102 after being decompressed. However, the attribute information is transmitted to the printing apparatus 102 without being compressed.

In the above-described step S604 in FIG. 6, "0" is stored in Bit6 and Bit7 of the attribute flag. After setting of the attribute flag in step S604 in FIG. 6 ends, the control unit 301 returns the process to the flowchart in FIG. 5.

Now, the description returns to the flowchart in FIG. 5. After the RIP process of CMYK planes (FIG. 6) in step S501 has ended, the process proceeds to step S502.

As described above, the print job that is received from the client computer 101 and that includes a cleat toner plane is PDL data having CMYK planes and a clear toner usage attribute of each page (based on setting in the field 405 in FIG. 4). In step S502, the control unit 301 determines whether the received PDL data includes a clear toner usage attribute transmitted from the printer driver.

If the control unit 301 determines in step S502 that the PDL data does not include a clear toner usage attribute transmitted from the printer driver, the process proceeds to step S503.

In step S503, the control unit 301 holds all the planes on which the RIP process has been performed. Here, the control unit 301 holds the CMYK planes. "Hold" means not transmitting a RIP result to the printing apparatus 102 but storing it in the storage unit in the PDL controller 103 (e.g., image memory 305 or hard disk 304).

After step S503, the process proceeds to step S508. On the other hand, if the control unit 301 determines in step S502 that the PDL data includes a clear toner usage attribute transmitted from the printer driver, the process proceeds to step S504.

In step S504, the control unit 301 performs a RIP process of a clear toner plane (FIG. 8) and creates data in which each pixel is composed of 8 bits. Now, the RIP process of the clear toner plane is described with reference to FIG. 8.

<RIP Process of Clear Toner Plane)

Figure 8:
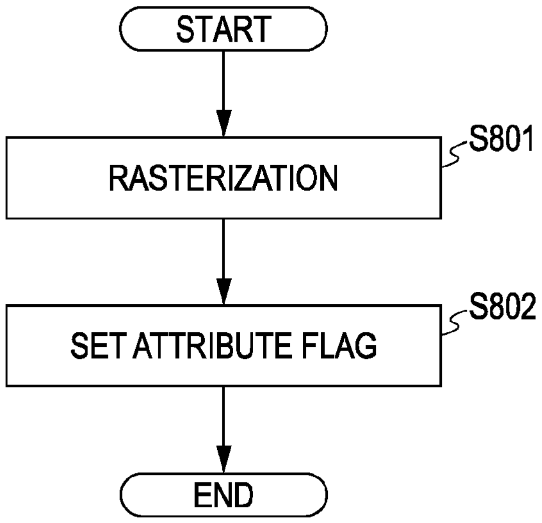
FIG. 8 is a flowchart illustrating an example of a RIP process of a clear toner plane performed in step S504 in FIG. 5.

FIG. 8 is a flowchart illustrating an example of the RIP process of the clear toner plane illustrated in step S504 in FIG. 5. The process in this flowchart is realized when the CPU (not illustrated) of the control unit 301 in the PDL controller 103 reads a program stored in the ROM or the hard disk 304 to the RAM and executes the program.

First, in step S801, the control unit 301 performs rasterization on the clear toner plane on the basis of the result of the RIP process of the CMYK planes performed in step S501 (FIG. 6) and generates output image data of the clear toner plane. The output image data is compressed by the image compressing/decompressing unit 303 and is written in the image memory 305.

The output image data of the clear toner plane is formed with each pixel being composed of 8 bits. The value of each pixel is calculated on the basis of a total amount of toner in each pixel of the CMYK planes. Here, "the total amount of toner" means the amount of toner transferred onto a sheet (the amount of toner put on a sheet) per pixel in accordance with a total signal amount of four colors C, M, Y, and K.

In an ordinary case, the total amount of toner is expressed as a percentage, a maximum value of a single color being 100%. When an image signal is expressed as an integer of 8 bits, a maximum value of a single color is "255". Thus, the sum of C, M, Y, and K is multiplied by 100/255, and the calculation result is regarded as the total amount of toner.

Typically, an upper limit of the total amount of toner is about 200 to 280%, and is determined by an image forming process.

For example, assume the following conditions:

(i) it is necessary to put 50% (predetermined amount) or more of clear toner in each pixel;

(ii) in the pixel having a maximum total amount of toner, C=140, M=140, Y=140, and K=140; and (iii) the upper limit in the printing apparatus (the upper limit of the amount of toner that can be put in printing in the printing apparatus) is 240%. In this case, the maximum total amount of toner of CMYK is calculated in the following expression (1). Here, 50% or more of clear toner is put on each pixel because the effect of printing with the clear toner can be sufficiently ensured. This value is set to a predetermined value depending on the material of the toner and the image forming process.

$$\text{The maximum total amount of toner of } CMYK=(140+140+140+140)\times 100/255=220\% \quad (1)$$

In this case, when the amount of clear toner is 50%, the total amount of C, M, Y, K, and clear toners in the pixel having the maximum total amount of toner is 220%+50%=270%.

In addition, the total amount of toner needs to be the same in all the pixels using a clear toner. Thus, in the other pixels using a clear toner (the pixels using a clear toner other than the pixel having the maximum total amount of toner), the value that is calculated in the following expression (2) and that does not exceed the maximum value of a single color "255" is set as the amount of clear toner. When the value exceeds the maximum value of a single color "255", "255" is set.

$$\text{The amount of clear toner}=(270-(C+M+Y+K)\times 100/255)\times 255/100 \quad (2)$$

In this way, after rasterization of the clear toner plane in step S801 has been completed and after output image data of the clear toner plane has been generated, the process proceeds to step S802.

In step S802, the control unit 301 sets the attribute flag in accordance with the result of the rasterization in step S801. Here, if the total amount of C, M, Y, K, and clear toners exceeds the upper limit of the printing apparatus 102 (240% in the above-described example), the control unit 301 sets "1" to Bit7 in the attribute flag of the pixel. If the total amount of toner does not exceed the upper limit of the printing apparatus 102, the control unit 301 sets "1" to Bit6 in the attribute flag of the pixel.

After setting of the attribute flag in step S802 in FIG. 8 has ended, the control unit 301 returns the process to the flowchart in FIG. 5.

Now, the description returns to the flowchart in FIG. 5. After the RIP process of the clear toner plane (FIG. 8) in step S504 has ended, the process proceeds to step S505.

In step S505, the control unit 301 determines whether there is a portion (pixel) where the amount of toner exceeds the upper limit available in the printing apparatus 102 in the page on the basis of the RIP result of the CMYK planes obtained in step S501 and the RIP result of the clear toner plane obtained in step S504.

If the control unit 301 determines in step S505 that there is no portion (pixel) where the amount of toner exceeds the upper limit available in the printing apparatus 102 in the page, the process proceeds to step S503.

In step S503, the control unit 301 holds all the planes on which the RIP process has been performed. Specifically, the control unit 301 combines the CMYK planes on which the RIP process is performed in step S501 with the clear toner plane, so as to generate output image data of 40 bits in total of CMYK+clear toners (8 bits per pixel). Also, the control unit 301 sets "1" to Bit6 in the attribute flag generated in step S501 and regards it as the attribute flag of the CMYK clear toner planes. Then, the control unit 301 holds the output image data generated through the combining and the attribute flag as CMYK clear toner planes. Then, the process proceeds to step S508.

On the other hand, if the control unit 301 determines in step S505 that there is a portion where the amount of toner exceeds the upper limit available in the printing apparatus 102 in the page, the process proceeds to step S506. At this time, the control unit 301 may determine whether the ratio of an image area where the amount of toner exceeds the upper limit in the entire image of one page exceeds a predetermined threshold (the amount of clear toner is not ensured to be 50%). This determination is made because an effect of printing with a clear toner can be sufficiently obtained even when the amount of toner exceeds the upper limit only in two or three pixels in one page. The threshold can be set by the user.

In step S506, the control unit 301 transmits the data of the CMYK planes obtained in the RIP process in step S501 to the printing apparatus 102 and allows the printing apparatus 102 to perform printing. The printing apparatus 102 receives the data of the CMYK planes and performs printing of the CMYK planes.

In step S507, the control unit 301 holds the clear toner plane obtained in the RIP process in step S504. At this time, the control unit 301 sets "1" to Bit7 in the attribute flag generated in step S504 (specifically in step S802) so as to generate the attribute flag of the clear toner plane. Then, the control unit 301 holds the output image data and the attribute flag as a clear toner plane. Then, the process proceeds to step S508.

In step S508, the control unit 301 determines whether the RIP process has been performed on all the pages. If the control unit 301 determines in step S508 that the RIP process has been performed on not all the pages, the process returns to step S501, where the control unit 301 performs the process on the next page. On the other hand, if the control unit 301 determines in step S508 that the RIP process has been performed on all the pages, the process proceeds to step S509.

In step S509, the control unit 301 determines whether there is a page including a portion where the amount of toner exceeds the upper limit. If the control unit 301 determines in step S509 that there is no page including a portion where the amount of toner exceeds the upper limit, the process proceeds to step S510.

In step S510, the control unit 301 performs control so that the data of all the pages held in step S503 is transmitted to the printing apparatus 102 and printing is performed. Accordingly, the printing apparatus 102 performs printing of all the held pages. In the page where use of the clear toner is set, the CMYK planes and the clear toner plane are simultaneously printed.

On the other hand, if the control unit 301 determines in step S509 that there is a page including a portion where the amount of toner exceeds the upper limit, the process proceeds to step S511.

In step S511, the control unit 301 provides instructions to allow an operation panel (not illustrated) of the printing apparatus 102 to display a guide (FIG. 9 or 10) to set a printout, which is generated based on the data of the CMYK planes transmitted to the printing apparatus 102 in step S506, on a paper feed tray of the printing apparatus 102.

Figure 9:
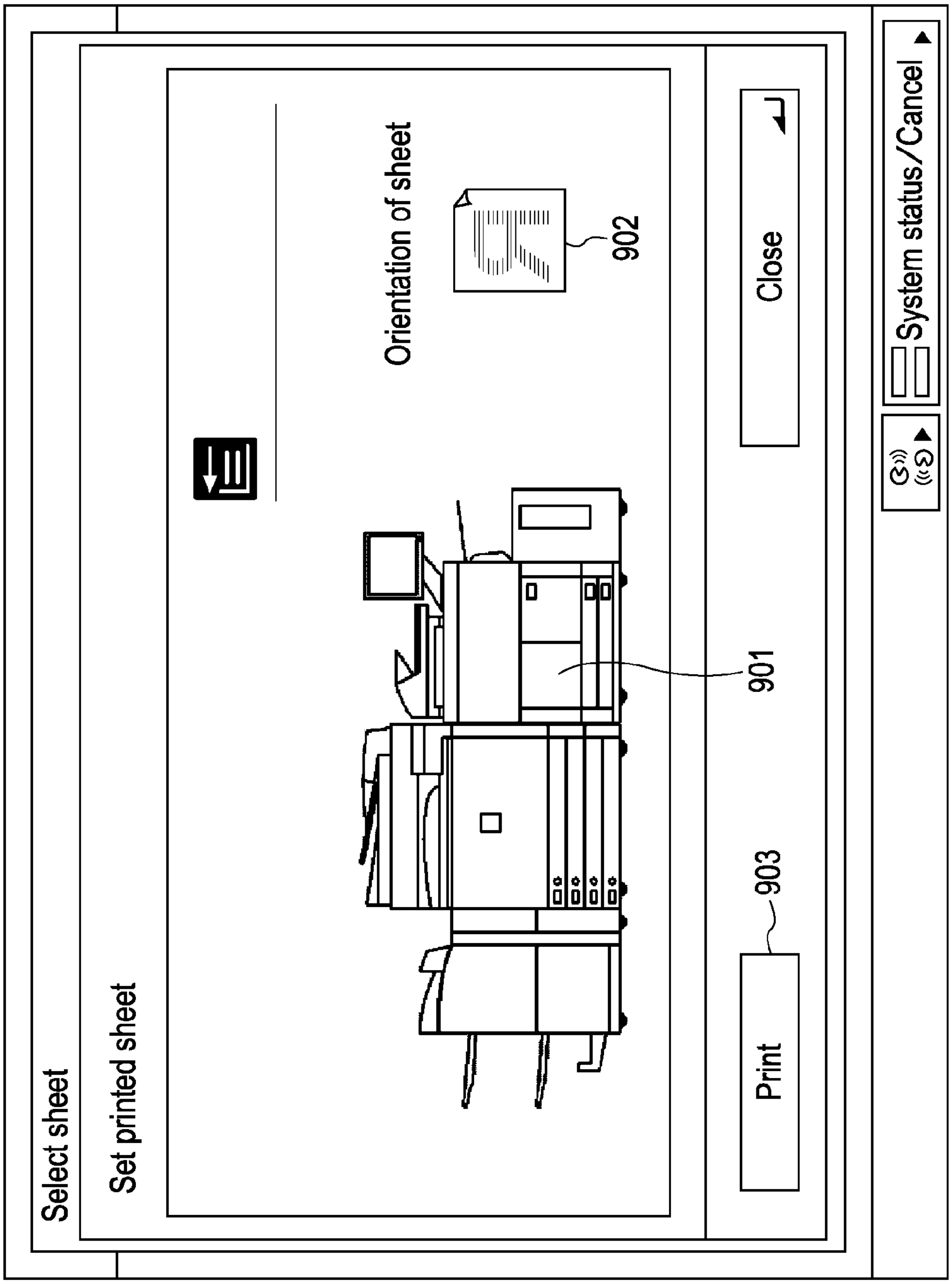
FIG. 9 illustrates an example of an instruction screen displayed to set a sheet on which CMYK printing has been performed to a paper cassette according to an embodiment of the present invention.
Figure 10:
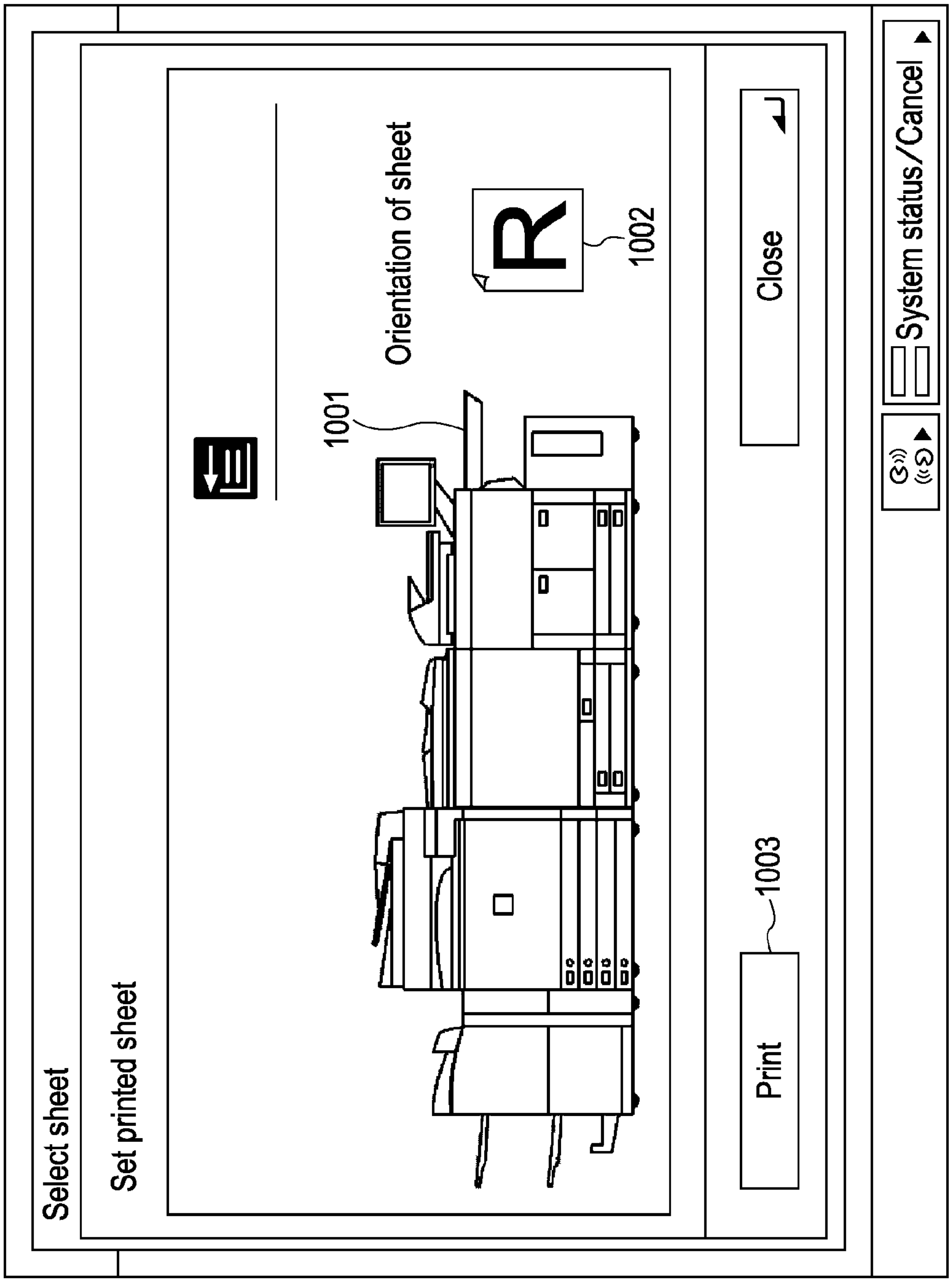
FIG. 10 illustrates an example of an instruction screen displayed to set a sheet on which CMYK printing has been performed to a manual paper feed tray according to an embodiment of the present invention.

In response to the instructions from the PDL controller 103 (instructions provided in step S511), the device controller (not illustrated) of the printing apparatus 102 outputs the display illustrated in FIG. 9 or 10 to a display device (not illustrated) of the printing apparatus 102. The display is performed after the entire printing process corresponding to the data of the CMYK planes transmitted from the PDL controller 103 to the printing apparatus 102 in step S506 has been completed. Alternatively, step S511 is performed after the control unit 301 of the PDL controller 103 has received, from the printing apparatus 102, a notification indicating that the entire printing process corresponding to the data of the CMYK planes transmitted from the PDL controller 103 in step S506 has been completed.

FIG. 9 illustrates an example of an instruction screen (guide display screen) that is displayed to set a CMYK-printed sheet to a paper cassette according to an embodiment of the present invention.

FIG. 10 illustrates an example of an instruction screen (guide display screen) that is displayed to set a CMYK-printed sheet to a manual paper feed tray according to an embodiment of the present invention.

Here, a paper feeder not specified by the printer driver (paper feed tray or paper cassette) is selected to set a sheet. For example, the paper cassette 225 is selected when the paper cassette 226 is specified by the printer driver. If both of the paper cassettes 225 and 226 are specified by the printer driver for using a plurality of sheets, the manual paper feed tray 227 is selected.

When the paper cassette 225 or 226 is selected, the control unit 301 provides instructions so that the screen illustrated in FIG. 9 is displayed on the operation panel (not illustrated) of the printing apparatus 102 because a sheet is fed after being inverted from the paper cassette 225 or 226. That is, the control unit 301 provides instructions about the place where the printed sheet is to be set as denoted by reference numeral 901 (paper cassette shaded in the figure) and the orientation in which the printed sheet is to be set as denoted by reference numeral 902 (sheet orientation (face up)).

When the manual paper feed tray 227 is selected, the control unit 301 provides instructions so that the screen illustrated in FIG. 10 is displayed on the operation panel (not illustrated) of the printing apparatus 102 because a sheet is fed without being inverted from the manual paper feed tray 227. That is, the control unit 301 provides instructions about the place where the printed paper is to be set as denoted by reference numeral 1001 (manual paper feed tray shaded in the figure) and the orientation in which the printed sheet is to be set as denoted by reference numeral 1002 (sheet orientation (face down)).

In response to such instructions from the PDL controller 103, the printing apparatus 102 displays the screen as illustrated in FIG. 9 or 10 on the operation panel (not illustrated). Specifically, the printing apparatus 102 displays a screen indicating the paper feeder where the printed sheet (printout generated in CMYK printing based on the instructions in step S506) is to be set and the orientation (face up/face down, upside/downside, etc.) of the sheet. Accordingly, the user can be notified of the paper feeder where the printed sheet is to be set and the orientation of the sheet. Also, a job ID, a user name, and so on may be displayed on the screen illustrated in FIG. 9 or 10.

After setting the sheet in accordance with the screen illustrated in FIG. 9 or 10, the user presses a print button (903 or 1003) on the operation panel to provide instructions to print the held job. Accordingly, the device controller (not illustrated) of the printing apparatus 102 requests the corresponding held job to the PDL controller 103.

In step S512, the control unit 301 receives the request for the held job from the printing apparatus 102, and performs control to transmit the job of the clear toner plane held in step S507 and the job of all the planes held in step S503 to the printing apparatus 102 and print the jobs.

Accordingly, the printing apparatus 102 performs printing of the job of the clear toner plane and the job of all the planes held in step S503 (i.e., all the pages are printed). In the printing of the job of the clear toner plane, the CMYK-printed sheet is supplied from the paper feeder indicated on the above-described screen (paper feeder not specified by the printer driver) and printing is performed. Also, in the printing of the job of all the planes held in step S503, a sheet is fed from the paper feeder specified by the printer driver and printing is performed.

With reference to step S512 in FIG. 5, a description has been given about the configuration of transmitting a held job from the PDL controller 103 to the printing apparatus 102 in response to a request for transmission of the held job from the printing apparatus 102.

Alternatively, the held job of the clear toner plane and the held job of all the planes may be transmitted to the printing apparatus 102 and may be stored in a box (hard disk) of the printing apparatus 102 before instructions provided in step S511. In this configuration, the user sets a sheet in accordance with the screen illustrated in FIG. 9 or 10 and then provides instructions to print the held job of the clear toner plane stored in the box from the operation panel, so as to perform printing. Likewise, the user provides instructions to print the held job of all the color planes stored in the box from the operation panel, so as to perform printing.

Also, in this configuration, a box number of a job, a user name, and so on may be displayed on the screen illustrated in FIG. 9 or 10.

Furthermore, if it is determined in step S505 in FIG. 5 that the amount of toner exceeds the upper limit, a warning message "Normal printing is not performed. Stop printing?" may be displayed in the host computer that has transmitted the print data, so that the user can select "Yes", or "No". In this way, when the amount of toner exceeds the upper limit, the user can select division of the job or stop of printing. For example, when a printer is in a remote site, the job should not be divided. In that case, the user can select "No" to cancel printing.

Alternatively, a screen allowing the user to select "perform printing by dividing the job", "cancel printing", or "perform printing only with CMYK planes" may be displayed.

By using such a selecting screen, the user can select a desired printing operation when the amount of toner exceeds the upper limit. For example, the job can be printed while being divided as described above. Also, the printing can be canceled. Also, printing with only the CMYK planes can be performed (and then printing with the clear toner plane is performed on the entire surface).

In the above-described example, the description has been given about the case where the printing apparatus 102 displays the screen illustrated in FIG. 9 or 10 immediately after receiving instructions from the PDL controller 103. However, the printing apparatus 102 may display the screen illustrated in FIG. 9 or 10 when the corresponding user logins in the printing apparatus 102. Accordingly, it can be prevented that a user operates a job of another user in mistake.

<Override of Print Setting and Re-RIP Process>

In the printing using the PDL controller 103, setting of the printer driver enables PDL data to be maintained in the hard disk 304 of the PDL controller 103 in addition to printing by the printing apparatus 102.

In that case, the user can perform the operations described below by accessing the PDL controller 103 from the client computer 101 by using a web browser.

That is, the user can change setting of the print job transmitted by himself/herself (override of print option), perform only the RIP process, delete an image on which the RIP process has been performed, and perform the RIP process again. Regarding the print job including an image on which the RIP process has been performed, the print job can be previewed from the web browser.

Figure 11:
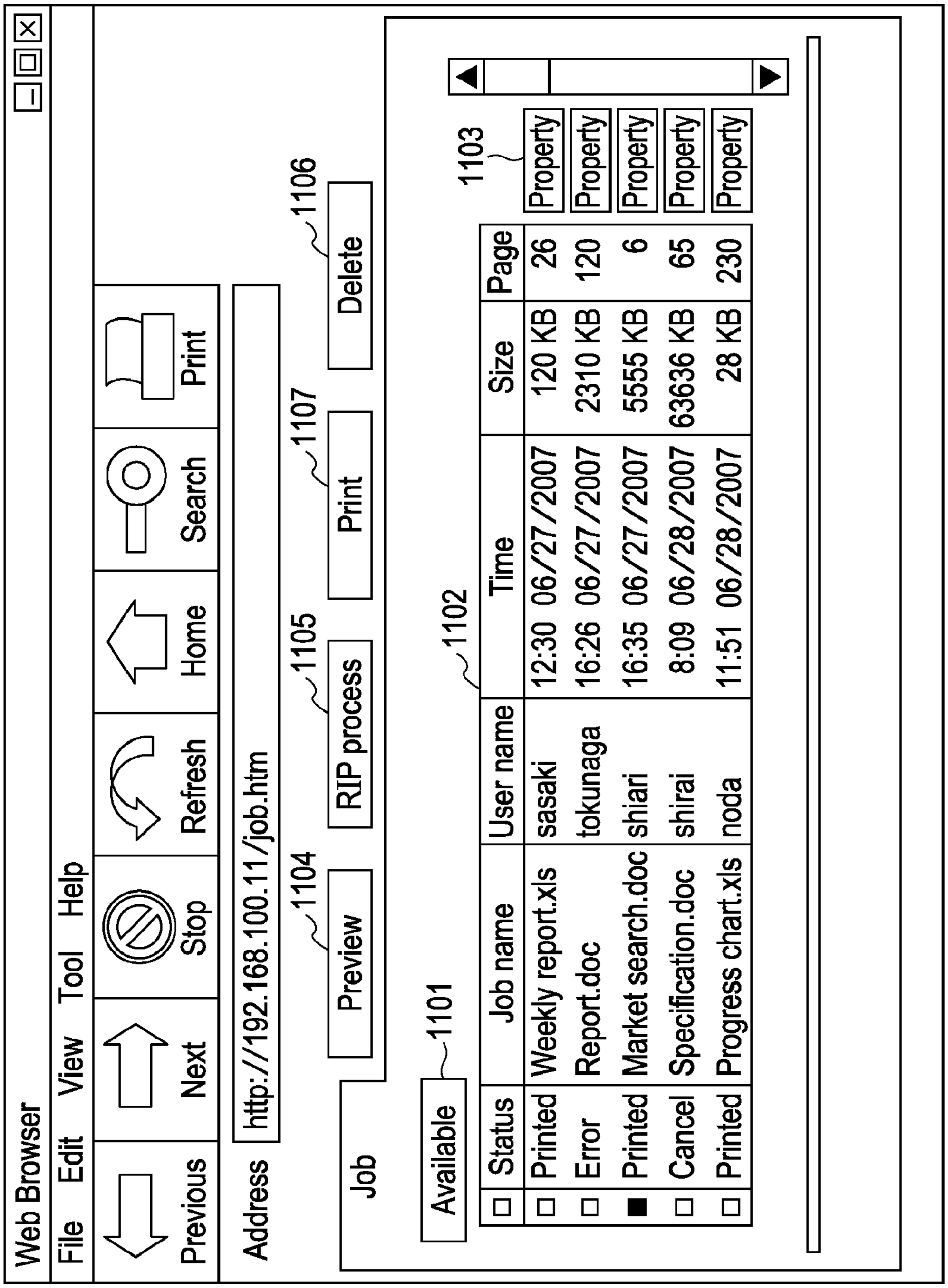
FIG. 11 illustrates an example of a screen displaying a web browser in the case of accessing the PDL controller.

FIG. 11 illustrates an example of a screen showing a display of a web browser when the user accesses the PDL controller 103.

Referring to FIG. 11, a field 1101 shows a status of the PDL controller 103. A field 1102 shows a list of jobs printed by the PDL controller 103. For example, in FIG. 11, the third job from the top is selected in the list of jobs 1102.

Property buttons 1103 are used to display the property of each job. By pressing the property button 1103, print setting can be changed. A preview button 1104 is used to preview a selected job. A RIP process button 1105 is used to perform a RIP process on PDL data.

A delete button 1106 is used to delete a job selected in the list of jobs 1102. A print button 1107 is used to perform printing of a job selected from the list of jobs 1102.

When a job using a clear toner is previewed, the clear toner plane is applied to attribute information and is not applied to a CMYK image, so that the clear toner plane is not displayed.

However, when the setting of using a clear toner is turned off by pressing the property button 1103 and when preview is performed after the RIP process has been performed by pressing the RIP process button 1105, the following is performed. That is, since the clear toner plane is applied to the CMYK image with a predefined color in a special process, the clear toner plane is displayed on the monitor like the CMYK planes.

Hereinafter, generation of planes in the printing apparatus 102 (image processing in the printing apparatus 102) is described with reference to FIG. 12.

<Generation of Planes in Printing Apparatus 102>

Figure 12:
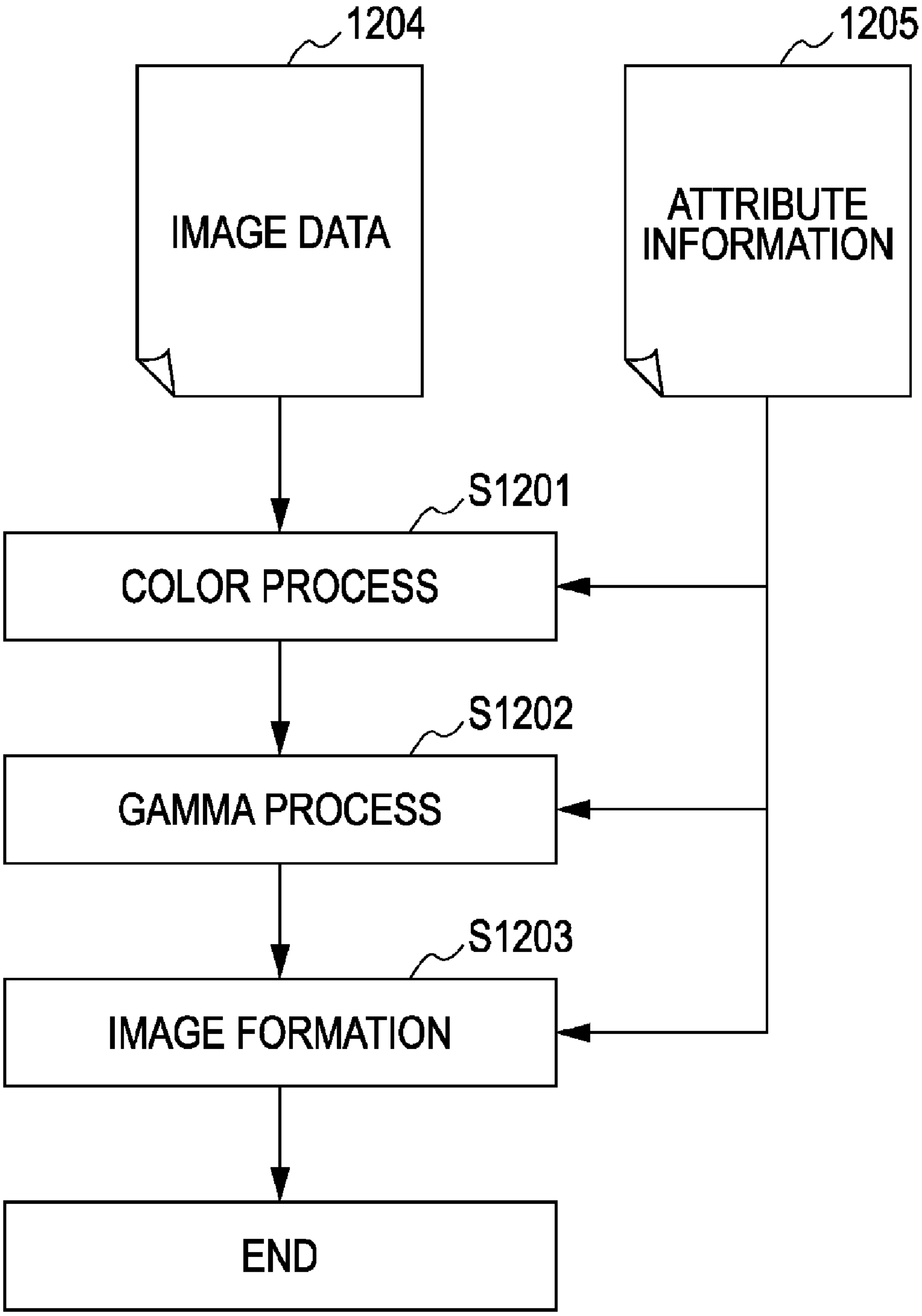
FIG. 12 is a flowchart illustrating an example of image processing performed in the printing apparatus.

FIG. 12 is a flowchart illustrating an example of image processing performed in the printing apparatus 102. The process in this flowchart is realized when the CPU in the device controller (not illustrated) of the printing apparatus 102 executes a program stored in a computer-readable storage medium (recording medium), such as a ROM.

In the process illustrated in FIG. 12, image data 1204 generated in the PDL controller 103 and attribute information 1205 attached thereto are input to the printing apparatus 102.

Bit6 and Bit7 (FIG. 7) in the attribute information 1205 are used in interpretation of the input image data 1204. When "1" is set in Bit6, the image data 1204 is interpreted as 40 bits in total of CMYK+clear (8 bits per pixel). When "1" is set in Bit7, the image data 1204 is interpreted as 8 bits in total of only clear (8 bits per pixel). When "0" is set both in Bits6 and Bit7, the image data 1204 is interpreted as 32 bits in total of CMYK (8 bits per pixel).

In step S1201, the device controller of the printing apparatus 102 performs a color process on the image data 1204, so that the color is changed on the printing apparatus side. More specifically, the device controller of the printing apparatus 102 calculates the percentages of the amount of toner by multiplying the values of respective colors of C, M, Y, K, and CL (clear toner) by 100/255.

Then, after the percentages of the amount of toner of C, M, Y, K, and CL have been determined, the process proceeds to step S1202, where the device controller of the printing apparatus 102 performs a gamma process optimum to the printing apparatus 102 on the image data of the respective colors on which the color process is performed in step S1201.

Then, in step S1203, the device controller of the printing apparatus 102 performs an image forming process on the pieces of image data of the respective colors on which the gamma process is performed in step S1202. The image forming process includes a screen process and an error diffusion process.

On the basis of the image data generated through the above-described image processing, the printing apparatus 102 performs printing on a sheet in a printer unit (not illustrated).

As described above, according to this embodiment, the user can easily perform printing using a clear toner by inputting a single job even when the amount of toner used exceeds the upper limit of the printing apparatus and when printing using a clear toner is not performed in a conventional configuration.

In the above-described embodiment, the process performed by the PDL controller 103 may be performed by the printing apparatus 102.

As described above, in the case where a job using a clear toner in addition to CMYK toners is performed, it is possible that the total amount of toner exceeds the limit of the printing apparatus and that improper printing occurs, e.g., the clear toner is put only partially. In this embodiment, if the amount of toner used exceeds the upper limit, the above-described single job is divided into two jobs and printing instructions are provided to the printer. Furthermore, when printing is performed based on the two jobs, a guide to set a printed sheet is displayed on the panel.

With this configuration, even when instructions to perform printing using color and clear toners in a single job are provided and when the amount of toner used exceeds the upper limit of the printing apparatus, occurrence of improper printing, e.g., a clear toner is put only partially, can be prevented.

On the user side, printing can be performed by inputting a single job, so that an inconvenient operation of manually inputting two jobs can be prevented. Furthermore, even when a single job is divided into two jobs, it can be prevented that a color print generated in advance is wrongly set for printing with a clear toner.

A second embodiment of the present invention will be described below referring to the drawings.

Figure 13:
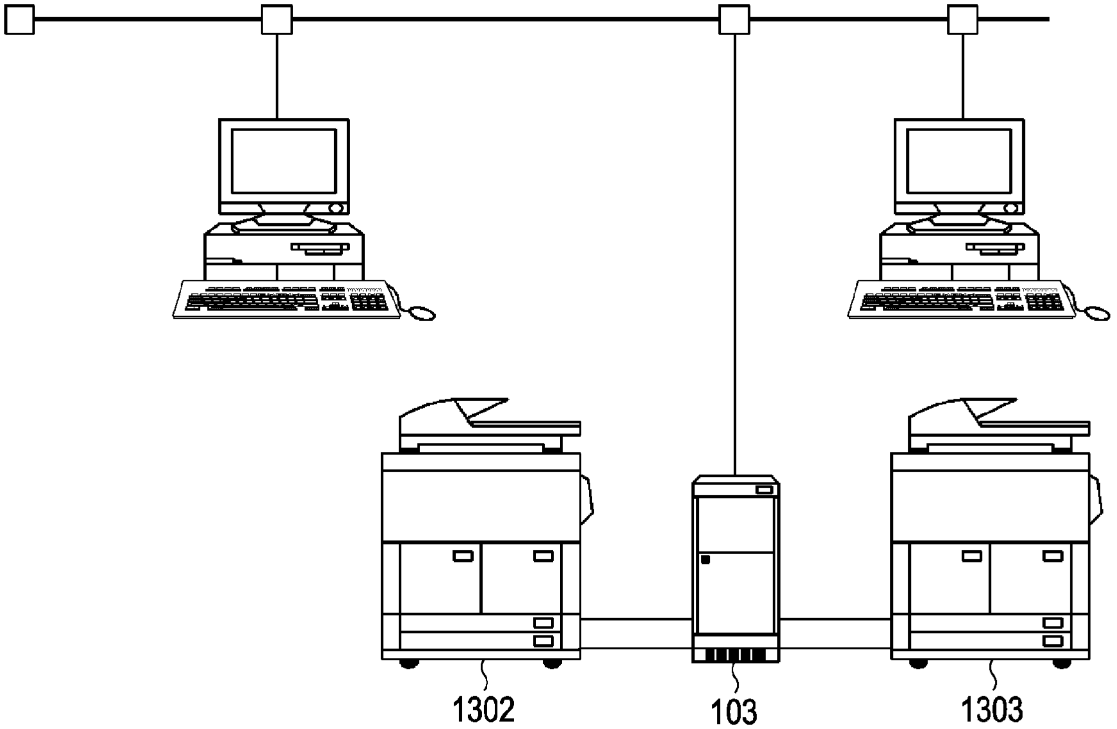
FIG. 13 illustrates a configuration of an image processing system according to another embodiment of the present invention.

FIG. 13 illustrates a configuration of an image processing system according to another embodiment of the present invention. In this embodiment, a description is given about an example where the PDL controller 103 connects to a printing apparatus 1302 and a printing apparatus 1303, as illustrated in FIG. 13. Assume that the printing apparatus 1302 is incapable of performing printing using a clear toner and that the printing apparatus 1303 is capable of performing printing using a clear toner.

When a user inputs, from a client computer to the PDL controller 103, a job that specifies the printing apparatus 1302 as an output apparatus and that includes use of a clear toner, the control unit 301 of the PDL controller 103 performs the same process as that in the flowchart illustrated in FIG. 5.

However, unlike in the above-described first embodiment, when setting to use a clear toner is made on the data transmitted to the printing apparatus in step S510 and step S512, the control unit 301 performs control to transmit the data to the printing apparatus 1303 capable of performing printing using a clear toner.

The display performed in step S511 in FIG. 5 is controlled to indicate instructions to set the printing apparatus 1303 in addition to the orientation of the sheet.

A third embodiment of the present invention will be described below referring to the drawings. In the above-described first embodiment, the description has been given about the configuration of dividing a job into two jobs for CMYK planes and a clear toner plane if the total amount of toner exceeds the upper limit of the printing apparatus 102. In this embodiment, a user can provide instructions to perform printing by dividing a job into jobs for CMYK planes and a clear toner plane regardless of the total amount of toner.

Figure 14:
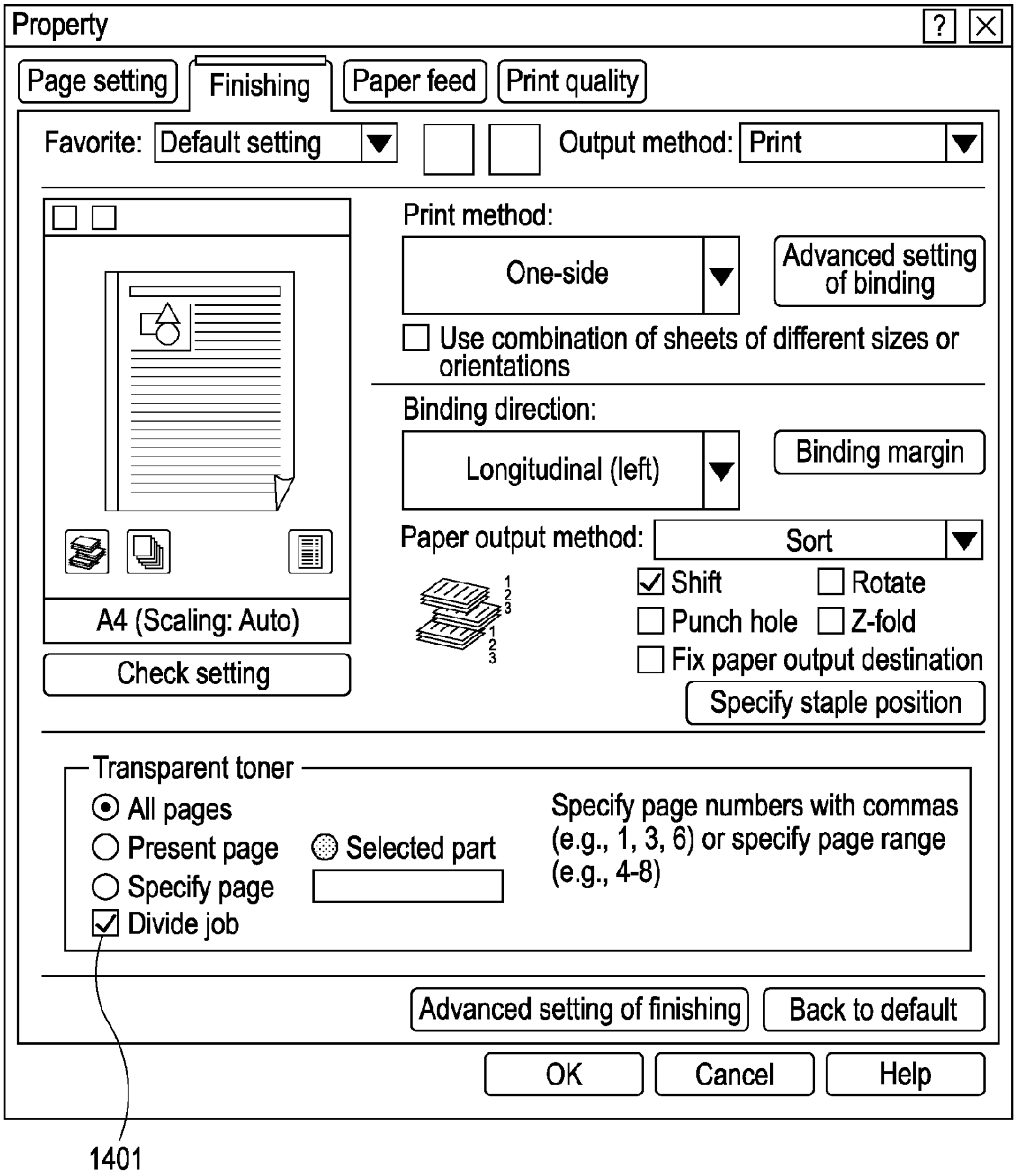
FIG. 14 illustrates a print setting window of the printer driver according to an embodiment of the present invention.

FIG. 14 illustrates a print setting window of the printer driver according to a third embodiment of the present invention. This print setting window is displayed on a monitor (not illustrated) of the client computer 101 when the CPU (not illustrated) of the client computer 101 executes a program stored in the HDD. On the print setting window, settings can be input by using a keyboard or a pointing device (not illustrated) of the client computer 101.

Referring to FIG. 14, reference numeral 1401 denotes a check box to divide a job. A user can provide instructions to perform printing by dividing a job into jobs for CMYK planes and a clear toner plane (specify division) regardless of the total amount of toner by checking the check box.

Alternatively, a job may not be divided into two jobs for CMYK planes and a clear toner plane even when the total amount of toner exceeds the upper limit of the printing apparatus 102, and instructions to cancel the job may be provided by the user.

That is, a check box to not divide a job is provided on the print setting window of the printer driver. By checking this check box, the user can automatically cancel the job when the total amount of toner exceeds the upper limit.

A fourth embodiment of the present invention will be described below referring to the drawings. In the above-described embodiments, the description has been given about a print job input from the client computer. Alternatively, the present invention can be applied to a copy job where image data read by the image scanner unit 201 of the printing apparatus 102 is printed in the printer unit 202 by using a clear toner. Also, the present invention can be applied to a print job where data stored in the box (hard disk) of the printing apparatus 102 is printed by using a clear toner.

When such a job is performed, the amount of toner used is calculated. If the amount of toner used exceeds the upper limit of the printing apparatus 102, the job is divided into a job of CMYK (color toners) and a job of a clear toner. Then, after printing the job of the color toners, the display illustrated in FIG. 9 or 10 is output. Then, after the sheet printed based on the job of CMYK has been set in the paper feeder specified in the display, control is performed to execute the job of a clear toner.

With this configuration, in the copy job using a clear toner and the print job of data in the box, improper printing using a clear toner due to the total amount of toner exceeding the limit of the printing apparatus can be prevented.

On the user side, printing can be performed by inputting a single job, so that an inconvenient operation of manually inputting two jobs can be prevented. Furthermore, even when a single job is divided into two jobs, it can be prevented that a color print generated in advance is wrongly set for printing with a clear toner.

The present invention is not limited to the above-described configuration and content of various pieces of data. Of course, various configurations and content can be adopted in accordance with applications and purposes.

The embodiments have been described above. The present invention can be applied to embodiments as a system, apparatus, method, program, or computer-readable storage medium. Specifically, the present invention can be applied to a system including a plurality of apparatuses or a single apparatus.

Hereinafter, a description is given about a structure of a memory map of a computer-readable storage medium carrying programs allowing a computer to execute the print control method illustrated in the above-described flowcharts, with reference to the memory map illustrated in FIG. 15.

FIG. 15 illustrates the memory map of the computer-readable storage medium (recording medium) storing various data processing programs that can be read by the print control apparatus according to an embodiment of the present invention.

Although not illustrated, information to manage a program group stored in the computer-readable storage medium, e.g., version information and an author, may be stored. Also, information depending on an OS (Operating System) on the program reading side, e.g., an icon to identify a program, may be stored.

Furthermore, data depending on various programs is managed in the above-described directory. Also, when a program to install various programs to a computer or an installed program is compressed, a decompressing program may be stored.

The functions illustrated in FIGS. 5, 6, 8, and 12 in the above-described embodiments may be executed by a host computer in accordance with programs that are externally installed. In that case, the present invention is applied even when an information group including the programs is supplied to an output apparatus from a computer-readable storage medium, such as a CD-ROM, a flash memory, or an FD, or from an external computer-readable storage medium via a network.

In this way, a computer-readable storage medium storing program codes of software realizing the functions of the above-described embodiments is supplied to a system or an apparatus. Then, a computer (or CPU or MPU) of the system or the apparatus may read and execute the program codes stored in the computer-readable storage medium.

In this case, the program codes read from the computer-readable storage medium realize new functions of the present invention, and thus the computer-readable storage medium storing the program codes is included in the present invention. The form of the programs is not specified as long as the function of the programs is provided. For example, an object code, a program executed by an interpreter, and script data supplied to the OS are acceptable.

Examples of the computer-readable storage medium to supply the programs include a flexible disk, a hard disk, an optical disc, a magneto-optical (MO) disc, a CD-ROM (Compact Disc Read Only Memory), a CD-R (CD Recordable), a CD-RW (CD Rewritable), a magnetic tape, a nonvolatile memory card, a ROM, and a DVD (Digital Versatile Disc).

In this case, the program codes read from the computer-readable storage medium realize the functions of the above-described embodiments, and thus the computer-readable storage medium storing the program codes is included in the present invention.

Alternatively, the programs can be supplied by accessing a web page on the Internet by using a browser of a client computer and by downloading the programs of an embodiment of the present invention from the web page to a computer-readable storage medium, such as a hard disk. Alternatively, the programs can be supplied by downloading a compressed file including an automatic install function from the web page to the computer-readable storage medium, such as a hard disk. Alternatively, the programs can be supplied by dividing program codes constituting the programs of an embodiment of the present invention into a plurality of files and by downloading the respective files from different web pages. That is, a WWW server and an FTP server allowing a plurality of users to download a program file to realize the functional processes of an embodiment of the present invention in a computer are included in the claims of the present invention.

Also, the programs of an embodiment of the present invention may be encrypted, stored in a computer-readable storage medium such as a CD-ROM, and distributed to users. Furthermore, a user who satisfies a predetermined condition may be allowed to download key information to decrypt the encryption from a web page over the Internet. Furthermore, the encrypted programs may be executed with the use of the key information and may be installed to the computer.

The functions of the above-described embodiments are realized when the computer executes the read programs. Also, the following configuration is applied. For example, an OS operating in the computer may execute part or all of actual processes on the basis of instructions of the program codes, and the functions of the above-described embodiments may be realized by the processes.

Furthermore, the program codes read from the computer-readable storage medium may be written in a memory provided in a function expansion board inserted to a computer or a function expansion unit connected to a computer. Then, a CPU or the like provided in the function expansion board or the function expansion unit may execute part or all of actual processes on the basis of instructions of the program codes written in the memory. With those processes, the functions of the above-described embodiments may be realized.

Also, the present invention may be applied to a system including a plurality of apparatuses or to a single apparatus. Of course, the present invention can be applied to the case of being achieved by supplying the programs to the system or the apparatus. In this case, when the computer-readable storage medium storing the programs represented by the software to achieve the present invention is read in the system or the apparatus, the system or the apparatus can obtain an advantage of the present invention.

The present invention is not limited to the above-described embodiments. Various modifications (including an organic combination of the respective embodiments) can be adopted on the basis of the effect of the present invention and are included in the scope of the present invention.

Various examples and embodiments of the present invention have been described. Those skilled in the art would understand that the effect and scope of the present invention are not limited to a specific description in this specification.

All configurations made by combining the above-described embodiments and their modifications are included in the present invention.

As described above, according to the embodiments of the present invention, in a print job of performing printing using a special toner, such as a clear toner, in addition to color toners of CMYK, improper printing with the clear toner due to a total toner amount exceeding the limit of a printing apparatus can be prevented.

Also, printing can be performed by inputting a single job, so that the user can avoid an inconvenient operation of manually inputting two jobs.

Furthermore, when a single job is divided into two jobs, it can be prevented that a color print generated in advance is wrongly set for printing using a clear toner. That is, the user can easily set the color print with CMYK toners to a proper paper feeder in a correct orientation (face up/face down, upside/downside) while seeing a guide displayed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-120541 filed May 2, 2008, which is hereby incorporated by reference herein in its entirety.

What is claimed is:

1. A print control apparatus, comprising at least a processor, to process a print job of providing instructions to perform printing using a plurality of color toners and a special toner for adjusting glossiness, the print control apparatus comprising:

a determining unit configured to determine whether a sum of a total amount of the color toners used and a predetermined amount of the special toner used exceeds an upper limit of an amount of toner used in printing in a printing apparatus specified in the print job in an image formed on the basis of the print job;

a dividing unit configured to divide the print job into a first print job using the color toners and a second print job using the special toner in accordance with a ratio in the entire image of an image area where the determining unit determines that the sum of the total amount of the color toners used and the predetermined amount of the special toner used exceeds the upper limit;

a transmitting unit configured to transmit the first and second print jobs generated by the dividing unit to the printing apparatus; and a display instruction unit configured to provide instructions to allow a display unit to display a guide to set a printout generated on the basis of the first print job using the color toners to a paper feeder of the printing apparatus when printing based on the second print job using the special toner is to be performed.

2. The print control apparatus according to claim 1, wherein the second print job using the special toner is executed by the printing apparatus after the first print job using the color toners has been executed by the printing apparatus.

3. The print control apparatus according to claim 1, wherein the determining unit determines whether the sum of the total amount of the color toners used and the predetermined amount of the special toner used exceeds the upper limit in units of pages, and wherein the dividing unit divides the print job of the page where the determining unit determines that the sum of the total amount of the color toners used and the predetermined amount of the special toner used exceeds the upper limit into the first print job using the color toners and the second print job using the special toner.

4. The print control apparatus according to claim 1, wherein the displayed guide includes specification of a paper feeder to which the printout is set and specification of an orientation of the printout set to the paper feeder.

5. The print control apparatus according to claim 4, wherein the displayed guide specifies, as the paper feeder to which the printout is set, a paper feeder not specified in the print job.

6. The print control apparatus according to claim 1, further comprising:

a canceling unit configured to provide instructions to cancel the print job when the determining unit determines that the sum of the total amount of the color toners used and the predetermined amount of the special toner used exceeds the upper limit.

7. The print control apparatus according to claim 1, wherein the transmitting unit transmits the first print job using the color toners and the second print job using the special toner to different printing apparatuses.

8. The print control apparatus according to claim 1, wherein the dividing unit divides the print job into the first print job using the color toners and the second print job using the special toner regardless of a determination result made by the determining unit when the print job includes division instructions.

9. A print control method in a print control apparatus to process a print job of providing instructions to perform printing using a plurality of color toners and a special toner for adjusting glossiness, the print control method comprising:

determining whether a sum of a total amount of the color toners used and a predetermined amount of the special toner used exceeds an upper limit of an amount of toner used in printing in a printing apparatus specified in the print job in an image formed on the basis of the print job;

dividing the print job into a first print job using the color toners and a second print job using the special toner in accordance with a ratio in the entire image of an image area where the determining determines that the sum of the total amount of the color toners used and the predetermined amount of the special toner used exceeds the upper limit;

transmitting the first and second print jobs generated in the dividing to the printing apparatus; and providing instructions to allow a display unit to display a guide to set a printout generated on the basis of the first print job using the color toners to a paper feeder of the printing apparatus when printing based on the second print job using the special toner is to be performed.

10. The print control method according to claim 9, wherein the second print job using the special toner is executed by the printing apparatus after the first print job using the color toners has been executed by the printing apparatus.

11. The print control method according to claim 9, wherein the determining determines whether the sum of the total amount of the color toners used and the predetermined amount of the special toner used exceeds the upper limit in units of pages, and wherein the dividing divides the print job of the page where the determining determines that the sum of the total amount of the color toners used and the predetermined amount of the special toner used exceeds the upper limit into the first print job using the color toners and the second print job using the special toner.

12. The print control method according to claim 9, wherein the displayed guide includes specification of a paper feeder to which the printout is set and specification of an orientation of the printout set to the paper feeder.

13. The print control method according to claim 12, wherein the displayed guide specifies, as the paper feeder to which the printout is set, a paper feeder not specified in the print job.

14. The print control method according to claim 9, further comprising:

providing instructions to cancel the print job by a canceling unit when the determining determines that the sum of the total amount of the color toners used and the predetermined amount of the special toner used exceeds the upper limit.

15. The print control method according to claim 9, wherein the transmitting transmits the first print job using the color toners and the second print job using the special toner to different printing apparatuses.

16. The print control method according to claim 9, wherein the dividing divides the print job into the first print job using the color toners and the second print job using the special toner regardless of a determination result made by the determining when the print job includes division instructions.

17. A non-transitory computer-readable storage medium storing a program to execute the print control method according to claim 9.

* * * * *